US008295592B2

(12) United States Patent
Washio

(10) Patent No.: US 8,295,592 B2
(45) Date of Patent: Oct. 23, 2012

(54) APPARATUS AND METHOD FOR ADJUSTING PIXELS VALUES OF OBJECT EDGES WITHIN IMAGES

(75) Inventor: Koji Washio, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1085 days.

(21) Appl. No.: 12/200,572

(22) Filed: Aug. 28, 2008

(65) Prior Publication Data

US 2009/0074289 A1 Mar. 19, 2009

(30) Foreign Application Priority Data

Sep. 13, 2007 (JP) ................................ 2007-237706

(51) Int. Cl.
*G06K 9/00* (2006.01)
(52) U.S. Cl. ......... 382/162; 382/164; 382/165; 382/167
(58) Field of Classification Search ............. 382/162
See application file for complete search history.

(56) References Cited

U.S. PATENT DOCUMENTS

| 4,437,122 | A | * | 3/1984 | Walsh et al. | 348/625 |
|---|---|---|---|---|---|
| 5,086,484 | A | * | 2/1992 | Katayama et al. | 382/270 |
| 5,109,274 | A | * | 4/1992 | Washio et al. | 358/518 |
| 5,208,663 | A | * | 5/1993 | Hiratsuka et al. | 358/500 |
| 5,329,385 | A | * | 7/1994 | Washio | 358/515 |
| 5,754,708 | A | * | 5/1998 | Hayashi et al. | 382/266 |
| 5,850,293 | A | * | 12/1998 | Suzuki et al. | 358/3.27 |
| 5,892,596 | A | * | 4/1999 | Nonaka et al. | 358/538 |
| 6,064,494 | A | * | 5/2000 | Hirota et al. | 358/1.9 |
| 6,215,914 | B1 | * | 4/2001 | Nakamura et al. | 382/284 |
| 6,600,832 | B1 | * | 7/2003 | Nakayama et al. | 382/162 |
| 6,625,331 | B1 | * | 9/2003 | Imaizumi et al. | 382/294 |
| 6,721,066 | B2 | * | 4/2004 | Hirota et al. | 358/1.9 |
| 6,795,576 | B2 | * | 9/2004 | Uchida et al. | 382/164 |
| 7,031,515 | B2 | * | 4/2006 | Fuchigami | 382/165 |
| 7,079,685 | B1 | * | 7/2006 | Hirota et al. | 382/167 |
| 7,310,167 | B2 | * | 12/2007 | Shirasawa | 358/1.9 |

(Continued)

FOREIGN PATENT DOCUMENTS

JP 07-273983 10/1995

(Continued)

OTHER PUBLICATIONS

Notificationo f Reasons for Refusal with English language translation issued by Japanese Patent Office on Aug. 5, 2011 in corresponding Japanese application No. 2007-237706.

*Primary Examiner* — Jason M Repko
*Assistant Examiner* — Gandhi Thirugnanam
(74) *Attorney, Agent, or Firm* — Finnegan, Henderson, Farabow, Garrett & Dunner, L.L.P.

(57) ABSTRACT

An apparatus and method provide logic for processing images. In one implementation, an image processing apparatus includes an edge extraction section, a judgment section, and an edge processing section. The edge extraction section extracts an edge of an object of a character or a line drawing included in an image. The judgment section judges a possibility that the object is an image including a plurality of colors, or that the object is a black object having a pixel value of an image of each color being not less than a certain value. The edge processing section adjusts the pixel value of the extracted edge of the object according to a result obtained by the judgment section.

12 Claims, 13 Drawing Sheets

U.S. PATENT DOCUMENTS

| | | | |
|---|---|---|---|
| 7,586,650 B2 * | 9/2009 | Washio | 358/3.15 |
| 7,899,244 B2 * | 3/2011 | Makino | 382/167 |
| 2001/0022851 A1 * | 9/2001 | Nagai et al. | 382/162 |
| 2002/0094122 A1 * | 7/2002 | Matsukubo et al. | 382/165 |
| 2004/0008884 A1 * | 1/2004 | Simske et al. | 382/165 |
| 2004/0012815 A1 * | 1/2004 | Fuchigami | 358/2.1 |
| 2004/0189725 A1 * | 9/2004 | Foster | 347/5 |
| 2005/0008250 A1 * | 1/2005 | Lim et al. | 382/266 |
| 2005/0265624 A1 * | 12/2005 | Washio | 382/273 |
| 2006/0023943 A1 * | 2/2006 | Makino | 382/167 |
| 2006/0088208 A1 * | 4/2006 | Nako et al. | 382/162 |
| 2006/0139353 A1 * | 6/2006 | Washio | 345/467 |
| 2006/0159338 A1 * | 7/2006 | Nako et al. | 382/167 |
| 2006/0188148 A1 * | 8/2006 | Nako et al. | 382/162 |
| 2008/0074699 A1 * | 3/2008 | Washio | 358/2.99 |
| 2009/0074289 A1 * | 3/2009 | Washio | 382/165 |
| 2011/0235906 A1 * | 9/2011 | Hashimoto | 382/165 |

FOREIGN PATENT DOCUMENTS

| | | |
|---|---|---|
| JP | 09-139843 | 5/1997 |
| JP | 2005-341249 | 12/2005 |

* cited by examiner

ORIGINAL IMAGE

AFTER THINNING PROCESS

BLACK CHARACTER BY HALF TONE (YMCK) → EDGE EMPHASIS PROCESS IS PERFORMED → AFTER EDGE EMPHASIS PROCESS   SECTIONAL IMAGE AT THE TIME OF PRINTING

*-- PRIOR ART --*

SOLID BLACK
CHARACTER
(K100%)

THINNING PROCESS
IS PERFORMED

AFTER THINNING
PROCESS

SECTIONAL IMAGE
AT THE TIME OF
PRINTING

APPARATUS AND METHOD FOR ADJUSTING PIXELS VALUES OF OBJECT EDGES WITHIN IMAGES

BACKGROUND OF THE INVENTION

1. Field of the Invention

The present invention relates to an image processing apparatus and an image processing method.

2. Related Art

Since dot gain of a printer of an electrophotographying system is large in comparison with a printer using an ink, a character may be printed thicker than intended when a same font character is printed. Accordingly, a process for making the line width of the character thin (hereinafter referred to as a thinning process) is performed by an image process (For example, see Japanese Patent Laid-Open No. 2005-341249). The thinning process is a process that evenly lowers the pixel value of outline portion of the character by converting it to a halftone level by capturing an edge of an image of a solid character (a character having a pixel value of a character portion being near the maximum value). Thereby, the solid character easy to become thick can seem thinly.

When the character is a halftone character (a character having a pixel value of a character portion being halftone), the jaggy generated by a screen process is a problem than becoming thick about the character. The edge emphasis process may be performed to reduce the jaggy. However, since the edge emphasis is performed to additionally draw the outline, there is tendency that makes the character thick. Additionally, the thinning process is performed to the solid character as disclosed in Japanese Patent Laid-Open No. 2005-341249, and on the other side, the edge emphasis process is performed to the halftone character. When comparing both the processes, an unbalance result may occur because the halftone character seems more thickly.

Especially, the tendency becomes remarkably when a black character is printed. With respect to a same black solid character, there is the case that it is outputted by a black monochrome or there is the case that it is outputted by four colors of C (cyan), M (magenta), Y (yellow), and K (black). For example, when a document prepared by word processing software is printed directly, the black solid character is printed by the black monochrome. However, when the document is converted to other file type such as PDF, and so on once, and printed, the black solid character may be printed using four colors of CMYK. Also, there is a possibility that the same case may occur when the setting is changed in a printer driver software.

In a document representing a black using four colors, it is considered to perform both the thinning process and the edge emphasis process. In order to represent the black, generally, each image of each color of CMYK is outputted at a density of 20-30% degree to overlap the images. That is, since each color image is halftone, the edge emphasis is performed without thinning it.

FIG. 11 are drawings showing that a screen process and/or an edge emphasis process is/are performed to an original image of each color when a black character is represented by overlapping halftone images of the four colors of CMYK. FIG. 12 is a view seen from an upper surface of a sheet after overlapping images of each color and a sectional view after printed. As shown in FIG. 11, since the jaggy occurs when the screen process is performed to a halftone image, it is necessary to perform the edge emphasis process. However, as shown in FIG. 12, since the outline is drawn by each color of CMYK when the edge emphasis is performed, toners of each color are always deposited in the outline portion of the character at the time of printing. Therefore, as shown in the sectional image in FIG. 12, the outline portion extends and the character becomes thick. That is, there is a possibility that the edge of the character is emphasized more than required. According to this, the tendency that the whole black character becomes thick occurs.

In contrast, as shown in FIG. 13, when black is represented by the black monochrome, the black is outputted by a high density near 100% being the maximum value. In this case, since the thinning process is performed to prevent that character become thick, the tendency that the character becomes thin occurs as shown in FIG. 13.

According to this, the inconvenience that a certain character becomes thin or a certain character becomes thick occurs according to whether it is outputted by the black monochrome or the four colors of CMYK in spite of the same font character.

SUMMARY OF THE INVENTION

It is, therefore, a main object of the present invention to prevent deteriorate of an image quality of a character or a line drawing.

In order to achieve the above mentioned object, it is, therefore, a first aspect of the present invention to provide an image processing apparatus comprising:

an edge extraction section for extracting an edge of an object of a character or a line drawing included in an image;

a judgment section for judging, based on the image, a possibility that the object is an image including a plurality of colors and the object is a black object having a pixel value of an image of each color being not less than a certain value; and an edge processing section for adjusting the pixel value of the extracted edge of the object according to a result obtained by the judging by the judgment section.

In accordance with a second aspect of the present invention, there is provided an image processing method comprising:

an edge extraction step of extracting an edge of an object of a character or a line drawing included in an image;

a judgment step of judging, based on the image, a possibility that the object is an image including a plurality of colors and the object is a black object having a pixel value of an image of each color being not less than a certain value; and an edge processing step of adjusting the pixel value of the extracted edge of the object according to a result obtained by the judging by the judgment step.

In accordance with a third aspect of the present invention, there is provided an image processing apparatus comprising:

an input section for inputting image data of an image;

an edge extraction section for extracting an edge of an object of a character or a line drawing included in an image;

a judgment section for judging, based on the image data, a possibility that the object is an image including a plurality of colors and the object is a black object having a pixel value of an image of each color being not less than a certain value;

an edge processing section for adjusting the pixel value of the extracted edge of the object according to a result obtained by the judging by the judgment section; and an output section for performing printout based on the image data including the adjusted pixel value of the edge.

BRIEF DESCRIPTION OF THE DRAWINGS

The above and other objects, advantages and features of the present invention will become more fully understood from the detailed description given below and the appended drawings, and the following descriptions pertain to the embodiment of the present invention are not intended to limit the present invention, and wherein.

DETAILED DESCRIPTION OF THE PREFERRED EMBODIMENTS

In the following, an embodiment of the present invention will be described with reference to the attached drawings. The following descriptions pertain to the embodiment of the present invention and are not intended to limit the present invention. MFP is an all-in-one image forming apparatus providing a plurality of functions such as a copy function, a printing function, and so on.

In this embodiment, an example that adapted the present invention to a Multi-Function Peripheral (MFP) is explained.

First, the structures are explained.

Figure 1:
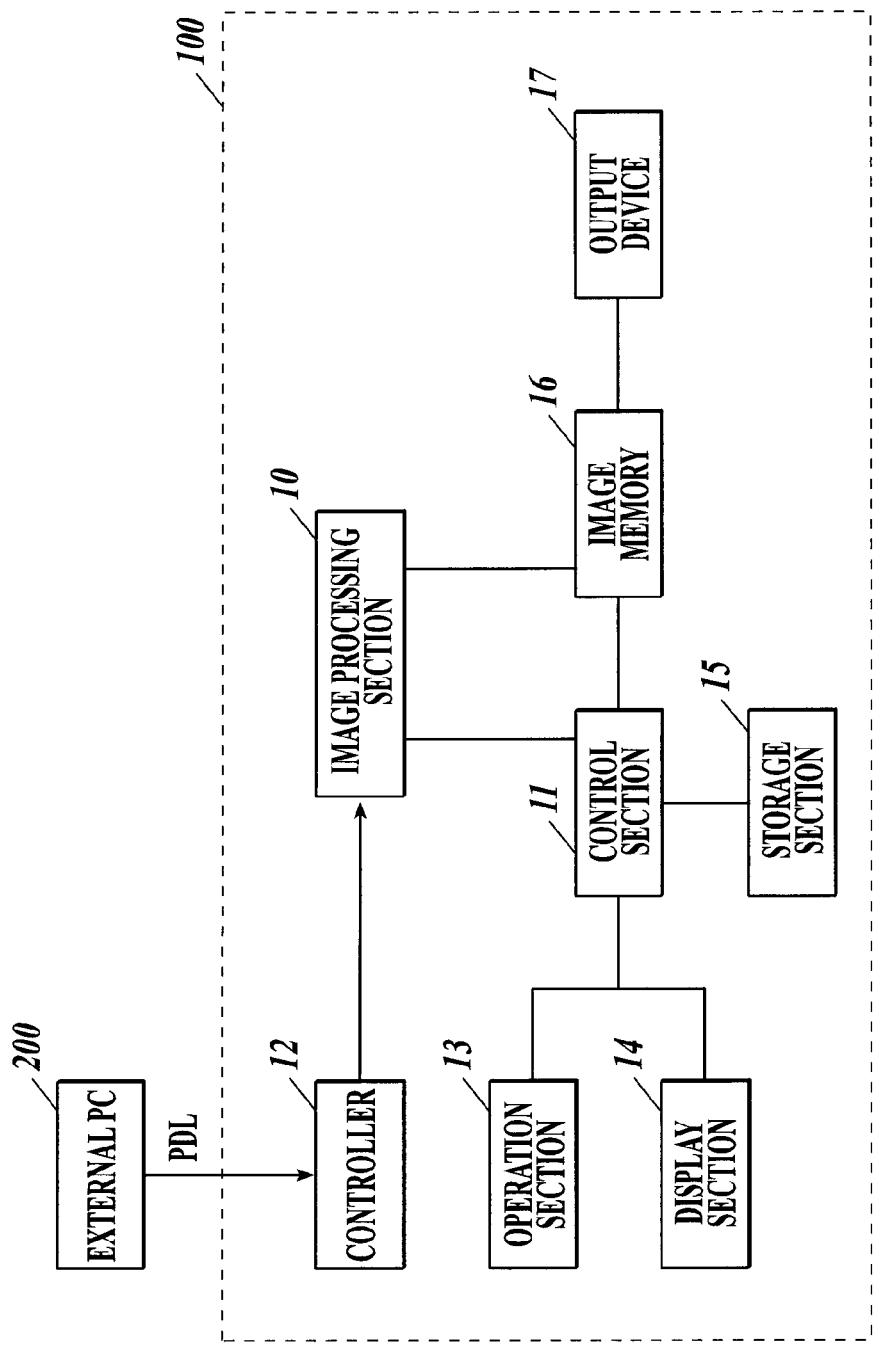
FIG. 1 is a diagram indicating structures of a Multi-Function Peripheral (MFP)

FIG. 1 shows a MFP 100.

The MFP 100 is connected to an external PC (personal computer) 200, generates image data from data of PDL (Page Description Language) format transmitted from the external PC 200, performs an image processing to the image data, and prints out it.

As shown in FIG. 1, the MFP 100 is composed of an image processing section 10, a control section 11, a controller 12, an operation section 13, a display section 14, a storage section 15, an image memory 16, and output device 17.

The control section 11 performs a centralized control of each section of the MFP 100 in cooperation with programs stored in the storage section 15.

The controller 12 generates data of an image G for each pixel by a rasterizing process, and an attribute information TAG. The attribute information TAG is information indicating any one attribute of a character, a line drawing or a photographic image with respect to each pixel of image G. The controller 12 outputs the image G to which the attribute information TAG is attached to the image processing section 10.

Specifically, since data of a document prepared by the external PC 200 is converted to a PDL form by printer driver software and transmitted to the controller 12, the controller 12 generates data of the image G for each pixel by the rasterizing process. In the rasterizing process, a PDL command is analyzed, the data of the image G of each color of CMYK and the attribute information TAG are generated for each image to be drawn (referred to as object). The image G is generated by assigning pixels to an object to be drawn and setting a pixel value to each assigned pixel.

The operation section 13 is used to input an operation instruction of an operator, and composed of various keys or a touch panel integrated with the display section 14, and so on. The operation section 13 generates a control signal in response to an operation and outputs it to the control section 11.

The display section 14 displays an operation screen, and so on a display according to the control of the control section 11.

The storage section 15 stores various control programs, parameters necessary for processes, setting data, and so on.

The image memory 16 is a memory for storing data of an image.

The output device 17 performs printing based on an image Gout outputted form the image processing section 10. The image Gout is generated by performing, by the image processing section 10, an image process to the image G generated by the printer controller 12.

The output device 17 performs printing by an electrophotographying system, and is composed of e.g. a feeding section, an exposure section, a development section, a fixing section, and so on. The output device 17 forms an electrostatic latent image by emitting laser beam onto a photosensitive drum by the exposure section based on the data of the image Gout at the time of printing. Then, a toner image is formed by attaching toners by the development section, the toner image is transferred on a sheet feed from the feeding section, and the toners are fixed to the sheet by the fixing section.

Next, in view of FIG. 2, the image processing section 10 relating to this embodiment will be described.

Figure 2:
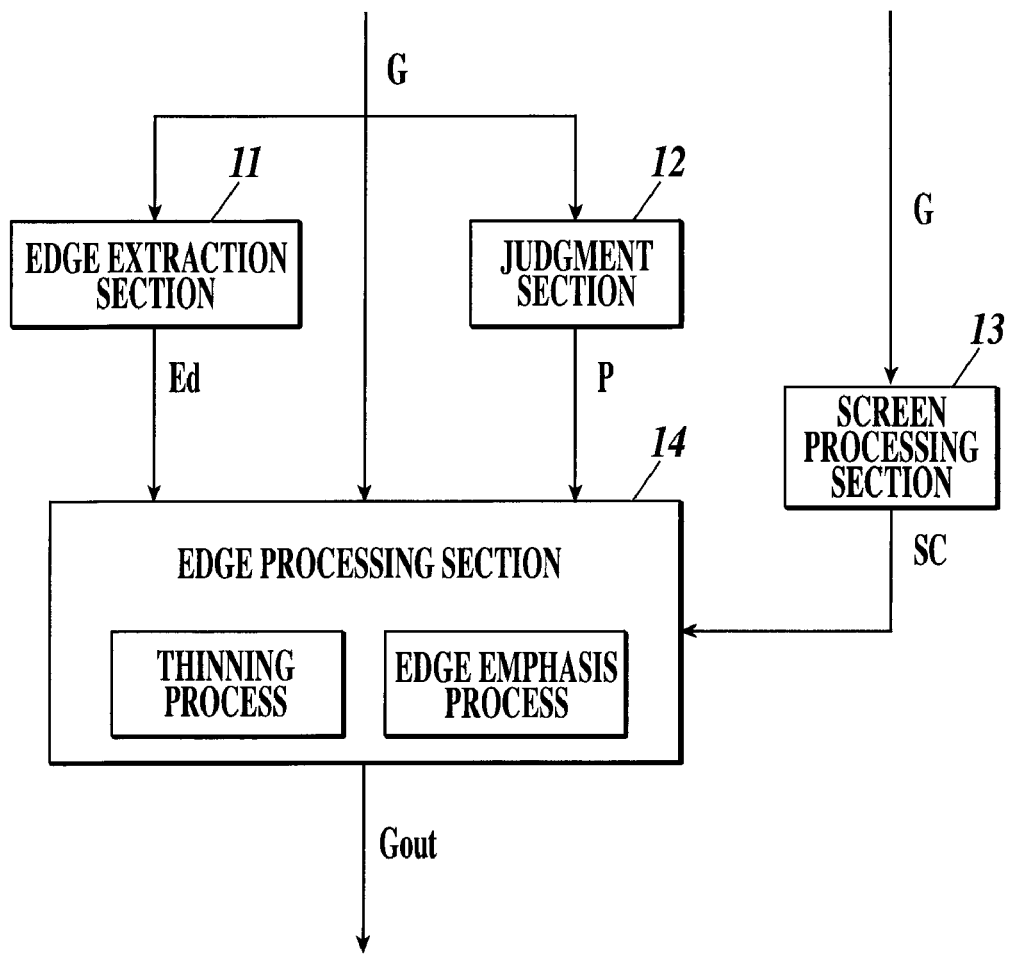
FIG. 2 is a diagram indicating an image processing section relating to the embodiment.

As shown in FIG. 2, the image processing section 10 is composed of an edge extraction section 11, a judgment section 12, a screen processing section 13, an edge processing section 14. The image G inputted to the image processing section 10 is used for processes of the edge extraction section 11, the judgment section 12, the screen processing section 13, and the edge processing section 14.

Hereinafter, the operations of each section will be described.

The edge extraction section 11 extracts an edge of an object of a character or a line drawing included in the image G. Specifically, The edge extraction section 11 judges whether a pixel composes an object of the character or the line drawing or a pixel composes an edge of an object with respect to all pixels of the image G (Hereinafter, referred to as attention pixel that is pixel being a judging object). The judgment is performed with respect to the image G of all colors. Then, with respect to each pixel, the edge extraction section 11 outputs edge information Ed indicating whether it is a pixel composing the edge of the object of the character or the line drawing or not. "Ed=ON" is information for indicating a pixel composing the edge, and "Ed=OFF" is information for indicating a pixel not composing the edge.

First, the edge extraction section 11 discriminates whether the pixel composes the object of the character or the line drawing in view of attribute information TAG with respect to the attention pixel. When the pixel is a pixel of a photographic image, the edge information Ed is outputted to the edge processing section 14 as Ed=OFF.

Figure 3:
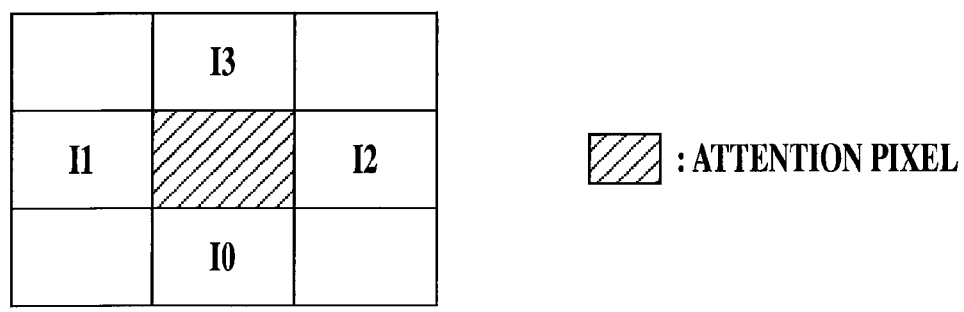
FIG. 3 is a diagram indicating an operation example for extracting an edge.

When the pixel is a pixel of the character or the line drawing, the attention pixel is set to a center position, an operator op of 3×3 pixels shown in FIG. 3 is applied to the image G to obtain the pixel values I0 to I3 of four pixels neighboring to the attention pixel.

After that, the differences E0 to E3 between the pixel value (shown by G) of the attention pixel and the pixel value I0 to I3 of the neighboring pixel is calculated by following equations. In addition, [ch] is sign indicating color of CMYK.

$$E0[ch]=G[ch]-I0[ch]$$

$$E1[ch]=G[ch]-I1[ch]$$

$$E2[ch]=G[ch]-I2[ch]$$

$$E3[ch]=G[ch]-I3[ch]$$

After that, the maximum value is obtained from among E0[ch] to E3[ch], and the maximum value is set to a positive edge signal PEDGE.

In a same manner, the maximum value is obtained from among signs which are obtained by reversing signs of E0[ch] to E3[ch], and the maximum value is set to negative edge signal REDGE. PEDGE and REDGE are shown by the following equations. In addition, Max( ) indicates a function for outputting the maximum value among the values in parenthesis.

$$PEDGE=Max(E0[ch],E1[ch],E2[ch],E3[ch])$$

However, PEDGE=0 when PEDGE<REDGE $$REDGE=Max(-E0[ch],-E1[ch],-E2[ch],-E3[ch])$$

However, REDGE=0 when REDGE<PEDGE

The obtained E0[ch] to E3[ch], PEDGE, and REDGE are edge intensities. Next, whether the attention pixel is a pixel composing an edge or not is judged by comparing the obtained PEDGE with a threshold value TH predetermined for PEDGE. If PEDGE>TH is satisfied, the edge information Ed indicating Ed=ON is outputted to the edge processing section 14. On the other hand, if PEDGE≦TH is satisfied, the edge information Ed indicating Ed=OFF is outputted.

The judgment section 12 judges a possibility being a pixel composing the black object with respect to all pixels of the image G, and generates judgment information P indicating a judged result and outputs it to the edge processing section 14. The black object is an object obtained by overlapping images of a plurality of colors in the objects of the character or the line drawing, and has a pixel value of each color not less than a certain value. The black object is visible to the black color by overlapping images of a plurality of colors each having a pixel value (density) not less than a certain value such as e.g. 20 to 30% of each color of YMC, not less than 30% of K, and so on.

The possibility being the black object is judged in a plurality of stages. Here, as examples, it is explained that the judgment is performed at five stages that there is no possibility being the black object (P=0), there is a possibility being at least black object (P=1), a possibility being the black object is high (P=2), a possibility being the black object is very high (P=3), and it is solid object (P=4). The judgment is performed by comparing threshold values α, β, γ (α<β<γ) with the pixel value of the each color. The threshold values α, β, γ are threshold values prepared in advance for judgment. The threshold value α may be set by experientially obtaining a density of the boundary of whether to be visible to the black color when overlapping images for each color of CMYK, the threshold value β may be set by experientially obtaining a density of the boundary to be certainly visible to the black color, and the threshold value γ may be set by experientially obtaining a density of the boundary of whether to be visible to the solid (density near the maximum) by a single color. For example, the values α=10%, β=20%, γ=90% can be applied. That is, when the maximum value of the pixel value to be set is 255, the values 25.5, 51, and 229.5 corresponding to 10%, 20%, and 90% of the maximum value 255 and the pixel value of the attention pixel are compared. In addition, different values of threshold values α, β, γ may be applied in different values for each color.

Hereinafter, a judging method is explained concretely in view of FIG. 4. The judgment is performed for each pixel.

Figure 4:
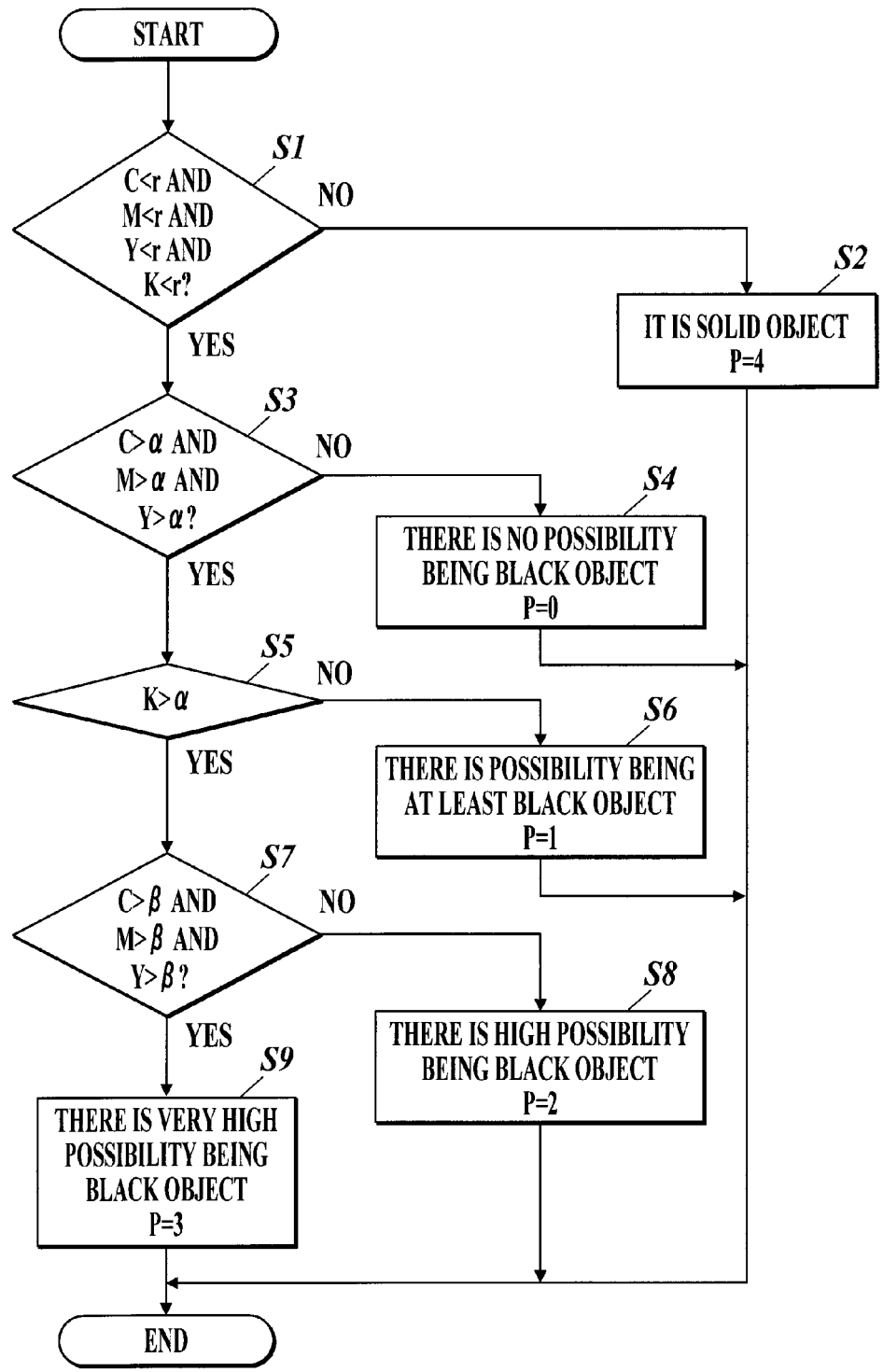
FIG. 4 is a flowchart for explaining a flow of processes for judging a possibility being a black object.

As shown in FIG. 4, the judgment section 12 compares a pixel value C, M, Y, or K of each color with the threshold γ in view of pixel value (hereinafter, pixel value of each color is shown by CMYK.) in the attention pixel with respect to each image G of four colors of CMYK (step S1). When any one of the pixel values C, M, Y, K is not less than γ (step S1; N), since it is considered that any color has a density near 100%, the judgment section 12 judges that the object is not a black object but solid object, and outputs judgment information P=4 (step S2).

On the other hand, when the pixel value satisfies C<γ, the pixel value satisfies M<γ, the pixel value satisfies Y<γ and the pixel value satisfies K<γ (step S1; Y), each pixel value C, M, Y other than black color is compared with the threshold α. When the pixel value does not satisfy C>α, the pixel value does not satisfy M>α or the pixel value does not satisfy Y>α (step S3; N), since it is considered that the pixel value C, M, Y of each color is small and it is not visible to the black color when images of each color are overlapped, the judgment section 12 judges that there is no possibility being the black object. The judgment section 12 sets the judgment information P to P=0, and outputs it (step S4).

On the other hand, when the pixel value satisfies C>α, the pixel value satisfies M>α, the pixel value satisfies Y>α and the pixel value does not satisfy K>α (step S3; Y, S5; N), it is not judged that the object is not the black object because of having a value being not less than α. Accordingly, the judgment section 12 judges that there is a possibility being at least black object, sets the judgment information P to P=1, and outputs it (step S6).

When the pixel value satisfies C>α, the pixel value satisfies M>α, the pixel value satisfies Y>α, and further the pixel value satisfies K>α (step S3; Y, S5; Y), the pixel value C, M, Y of each color other than black is compared with the threshold β (α<β). When the pixel value does not satisfy C>β, the pixel value does not satisfy M>β or the pixel value does not satisfy Y>β (step S7; N), though it can not be judged that it is certainly visible to the black color when overlapping images of each color, a possibility that it is visible to the black color is high. Accordingly, the judgment section 12 judges that a possibility being the black color is high, sets judgment information P to P=2, and outputs it (step S8).

On the other hand, when the pixel value satisfies C>β, the pixel value satisfies M>β and the pixel value satisfies Y>β (step S7; Y), since only colors other than black have the value being not less than β, it is considered that it is certainly visible to the black color when overlapping images of each color of CMYK. accordingly, the judgment section 12 judges that a possibility being black object is very high, and sets the judgment information P to P=3, and outputs it (step S9).

The screen processing section 13 performs a screen process to images of four colors of CMYK. An image SC after performing the screen process is outputted to the edge processing section 14. Hereinafter, the pixel value of the image SC after performing the screen process is often shown by SC.

The edge processing section 14 adjusts pixel values of pixels composing an edge of the black object included in the image G, and outputs the image Gout after adjusting it. Hereinafter, the pixel value of each pixel of the image Gout is often shown by Gout. That is, since the images having the pixel values being not less than a certain value are overlapped using a plurality of colors when the black object is printed, the toners extend in an edge and there is the tendency that the edge becomes thick. Therefore, the pixel values are adjusted in order to make overlapping of toners at the edge small. Also, since there is a problem about the jaggy of the screen process if the pixel value of the object not being the black object is halftone, it is necessary to adjust so as to increase the pixel value of the edge by the edge emphasis process.

Figure 5:
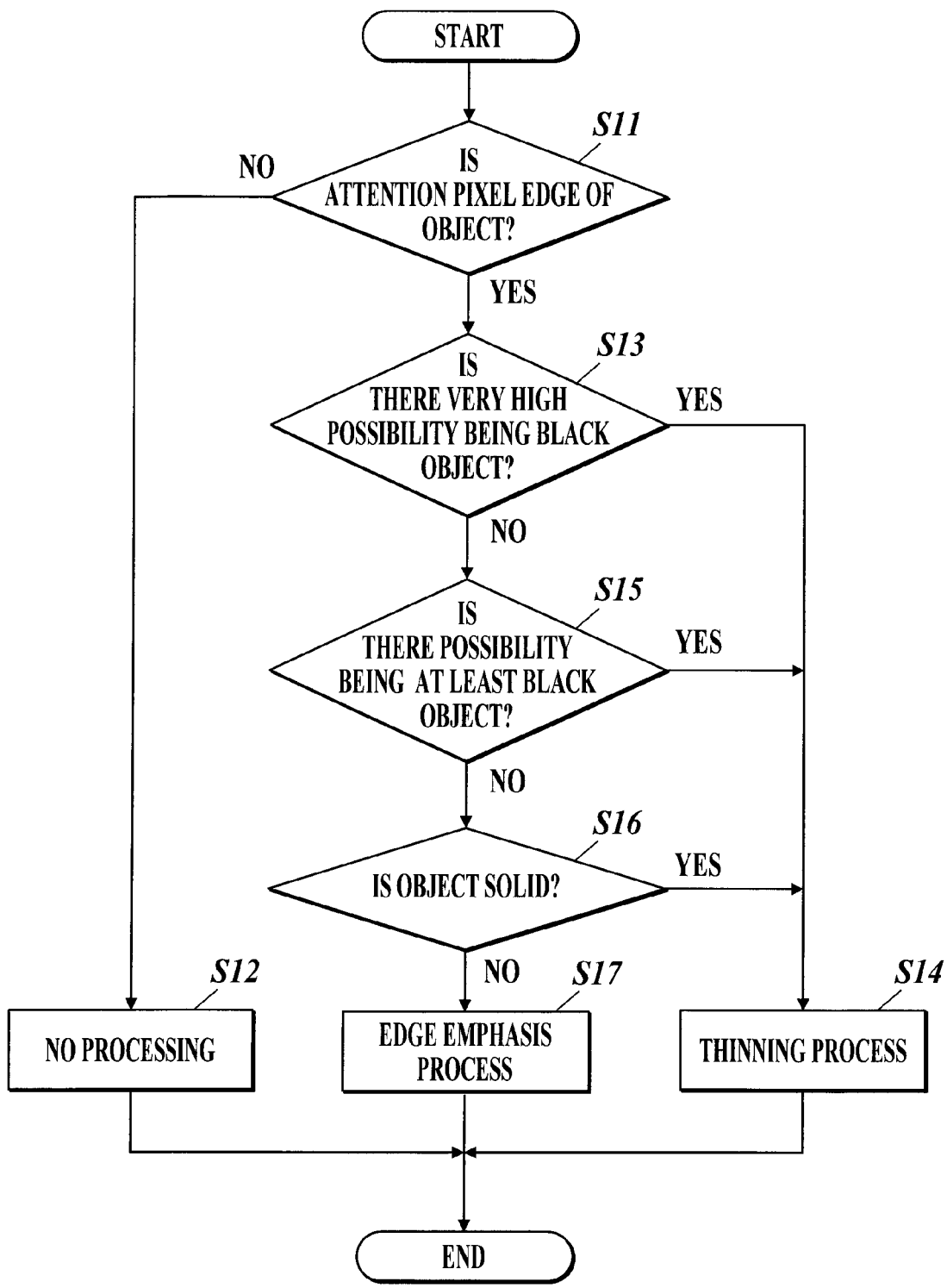
FIG. 5 is a flowchart for explaining a flow of processes when performing an edge adjustment.

FIG. 5 is a flowchart showing a whole follow of the adjustment of the edge processing section 14. The adjustment is performed for each pixel.

As shown in FIG. 5, the edge processing section 14 judges whether a pixel composes an edge of an object of a character or a line drawing in view of edge information Ed inputted from the edge extraction section 11 with respect to an attention pixel being a target of adjustment (step S11). When it is discriminated that Ed=OFF is satisfied and the pixel does not compose an edge of an object (step S11; N), the thinning process and the edge emphasis process are not performed, that is, both processes are not performed, and the pixel value SC obtained after screen process inputted from the screen processing section 13 is outputted as a pixel value Gout of the attention pixel (step S12).

When Ed=ON is satisfied and the attention pixel is a pixel composing the edge of the object of the character or the line drawing (step S11; Y), the edge processing section 14 judges a possibility that the attention pixel composes a pixel of the black object based on the judgment information P inputted from the judgment section 12. When P=3 is satisfied and a possibility that the attention pixel is a pixel composing the black object is very high (step S13; Y), the thinning process is performed to the attention pixel (step S14). The edge processing section 14 outputs the pixel value IS obtained after performing the thinning process as a pixel value Gout of an attention pixel.

In the thinning process, it is judged whether the foreground is visually deeper than background in the edge, that is, whether PEDGE>REDGE is satisfied. If PEDGE>REDGE is satisfied, the pixel value IS obtained after performing the thinning process is calculated by a following equation.

$$IS[ch]=G[ch]+(REDGE[ch]-PEDGE[ch])\times STVL/256$$

In addition, STVL is a coefficient for adjusting a degree of the thinning, and has a range of value of 0 to 256.

When PEDGE>REDGE is not satisfied, the original pixel value G itself is outputted as IS[ch]=G[ch].

Figure 6A:
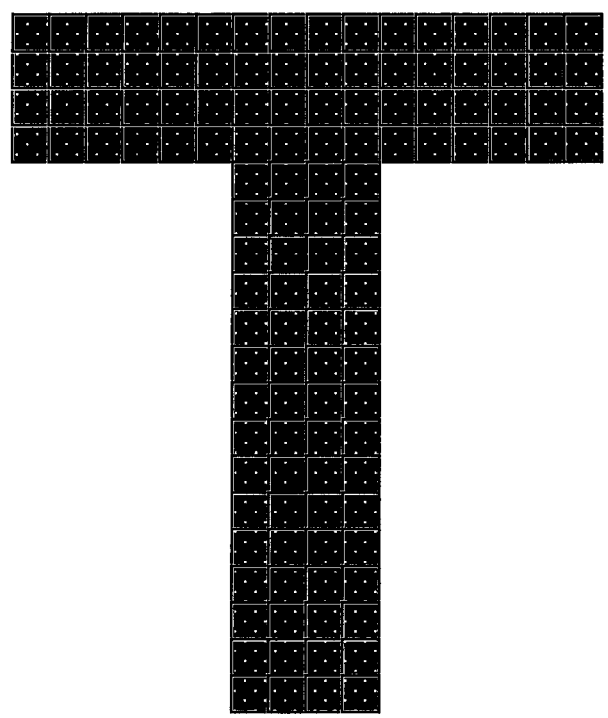
FIG. 6A is a drawing indicating an original image of a black object.
Figure 6B:
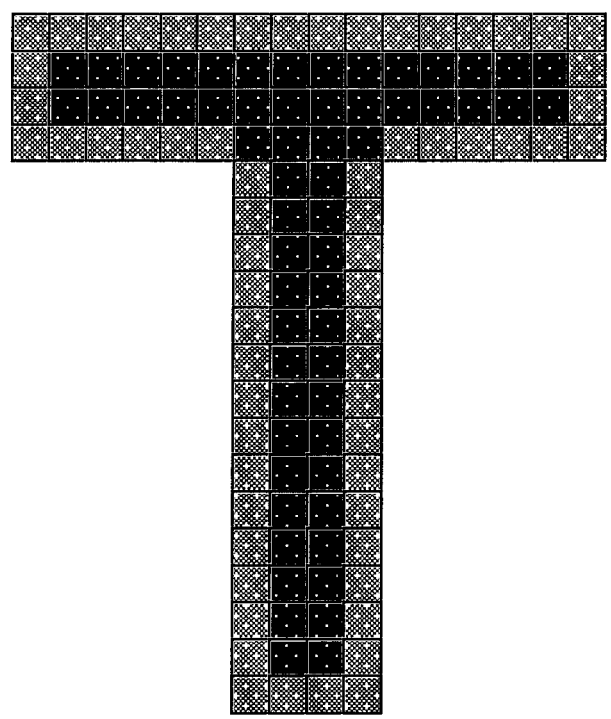
FIG. 6B is a drawing indicating a process result obtained by performing a thinning process to an image shown in FIG. 6A.

FIG. 6A is a drawing showing an original image of a character "T" being the black object. After performing the thinning process, as shown in FIG. 6B, the pixel value is reduced with respect to pixels composing the edge of the character. As a result, since overlapping toners become small in the edge portion at the time of printing even if images of each color of CMYK are overlapped, the extension of the toners becomes small, and it is possible to prevent that the character becomes thick.

On the other hand, when the judgment information P is 0 to 2 (step S13; N), it is not considered that a possibility that the pixel composes the black object is very high. Then, it is judged whether there is a possibility being at least black object (step S15). When P=1 or P=2 is satisfied and there is a possibility being at least black object (step S15; Y), the thinning process is performed to the attention pixel (step S14). The edge processing section 14 outputs the pixel value IS obtained after performing the thinning process as a pixel value Gout of the attention pixel.

When the judgment information P is P=0 and there is no possibility that the pixel composes the black object (step S15; N), it is judged whether it is a solid object, that is, whether the judgment information P is P=4 (step S16). When it is the solid object (step S16; Y), the thinning process is performed to the attention pixel (step S14). When it is not the solid object (step S16; N), the edge emphasis process is performed to the attention pixel (step S17). The edge processing section 14 outputs the pixel value LA obtained after performing the edge emphasis process as a pixel value Gout of the attention pixel.

Figure 7:
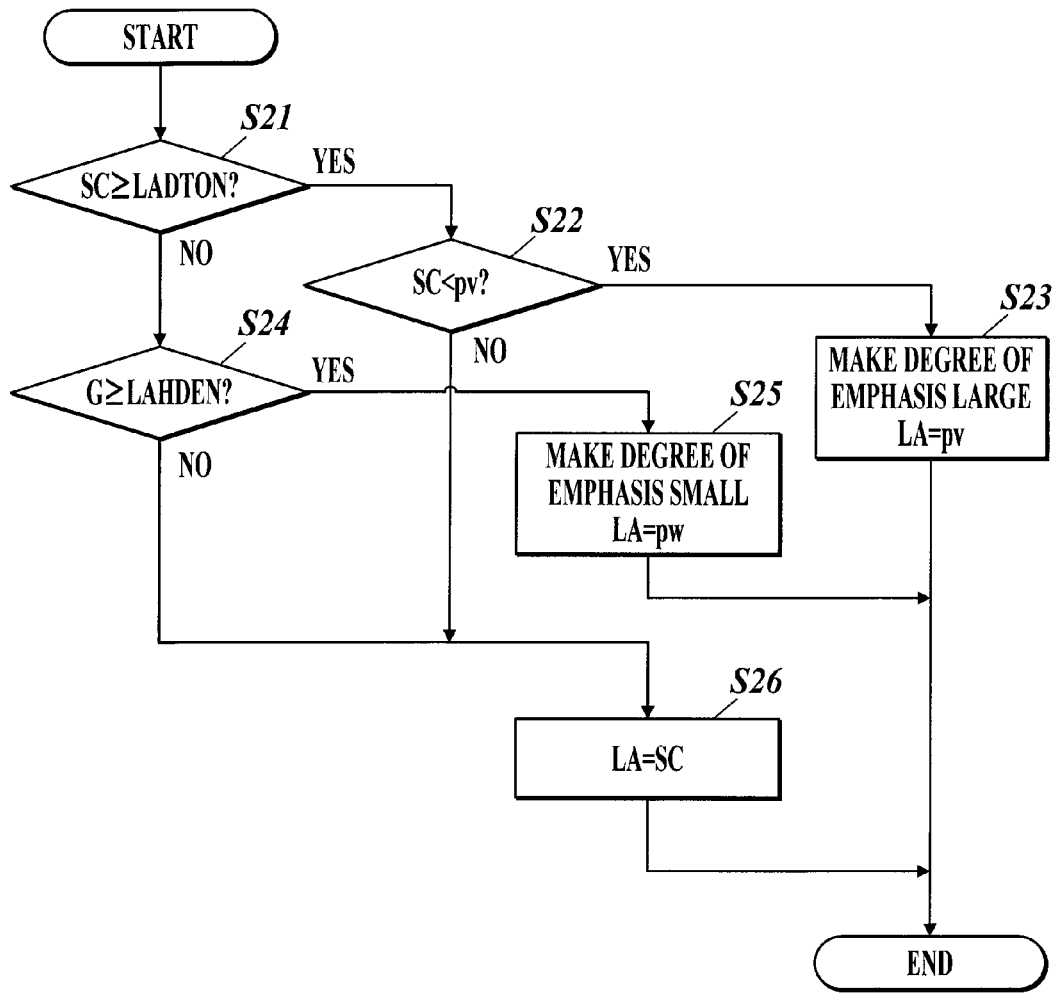
FIG. 7 is a flowchart for explaining a flow of an edge emphasis process.

In the edge emphasis process, after performing processes shown in FIG. 7, the pixel value obtained after performing the edge emphasis process is determined.

As shown in FIG. 7, first, the pixel value SC obtained after performing the screen process with respect to the attention pixel is compared with a threshold LADTON, it is judged whether SC≧LADTON is satisfied (step S21). After performing the screen process, the threshold LADTON is a threshold value set in advance as a boundary value of whether the dot is outputted in a density capable of visually confirming it in some degree.

Figure 8:
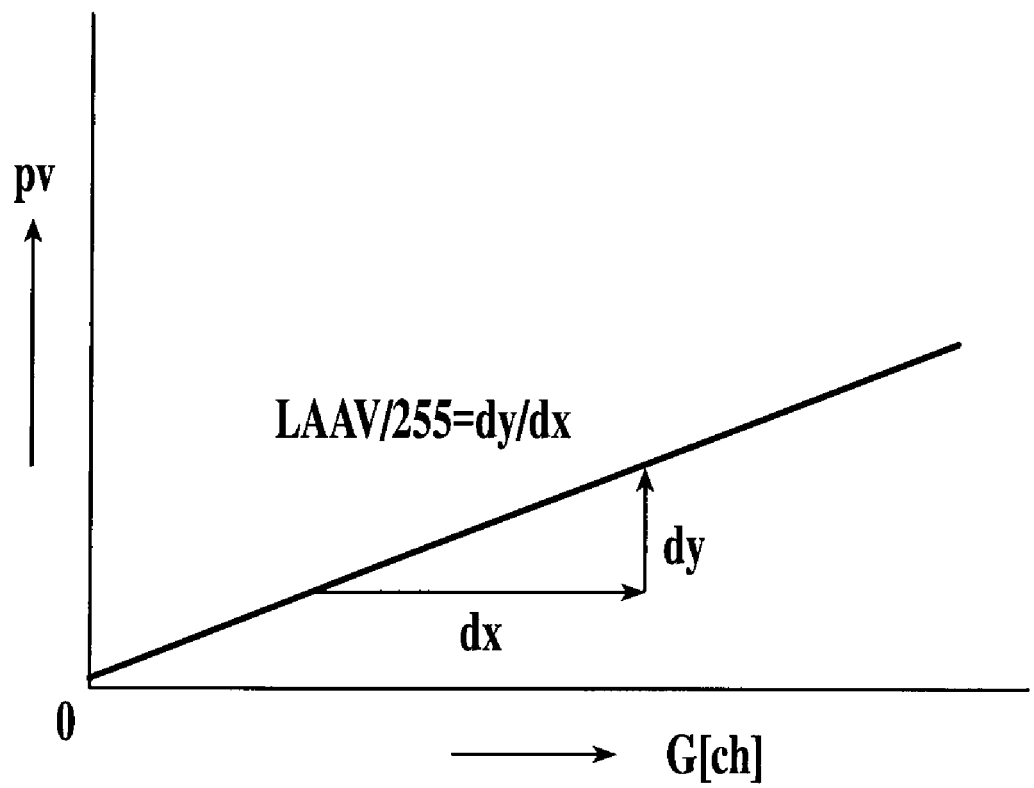
FIG. 8 is a diagram indicating a function for obtaining pv used in an edge emphasis process.

When SC≧LADTON is satisfied (step S21; Y), the pixel value SC is compared with threshold value pv and it is judged whether SC<pv is satisfied (step S22). The threshold value pv is a threshold value used to judge whether the dot becomes low density, and the threshold value pv is obtained by a function shown in FIG. 8. the function shown in FIG. 8 is a primary function of the pixel value G, and represented by the following equation.

$$pv=LAAV\times G$$

However, pv=0 when pv<0 is satisfied, pv=Max when pv>Max is satisfied. LAAV indicates an inclination of the function, and can be a value of 0 to 2.

That is, pv is proportional to the original pixel value G, and pv will also become big if the original pixel value G is big.

When SC<pv is satisfied (step S22; Y), the pixel value LA of the attention pixel is set to LA=pv (step S23). On the other hand, when SC<pv is not satisfied (step S22; N), the pixel value LA of the attention pixel is set to LA=SC, and a result of the screen process is outputted itself (step S26). The edge emphasis is performed by selecting a bigger value from pv and SC.

Next, when SC≧LADTON is not satisfied (step S21; N), the original pixel value G is compared with the threshold value LAHDEN and it is judged whether G≧LAHDEN is satisfied (step S24). The threshold value LAHDEN is a threshold value used to judge whether the original pixel value G is a big value. When G≧LAHDEN is satisfied (step S24; Y), the pixel value LA of the attention pixel is set to LA=pw (step S25).

Pw is obtained by a function of the following equation.

$$pw=LAAW\times G$$

However, pw=0 when pw<0 is satisfied, and pw=Max when pw>Max is satisfied. LAAW shows an inclination of the function and can be a value 0 to 2.

On the other hand, when G≧LAHDEN is not satisfied (step S24; N), since the pixel value SC obtained after performing the screen process is not so big, the pixel value SC obtained after performing the screen process is set to the pixel value LA of the attention pixel (step S26).

Thus, if the original pixel value G is a big value, the dot corresponding to the original pixel value G is outputted by selecting pw, and if the original pixel value G is not the big value, the dot of a low density is outputted by selecting SC.

Figure 9:
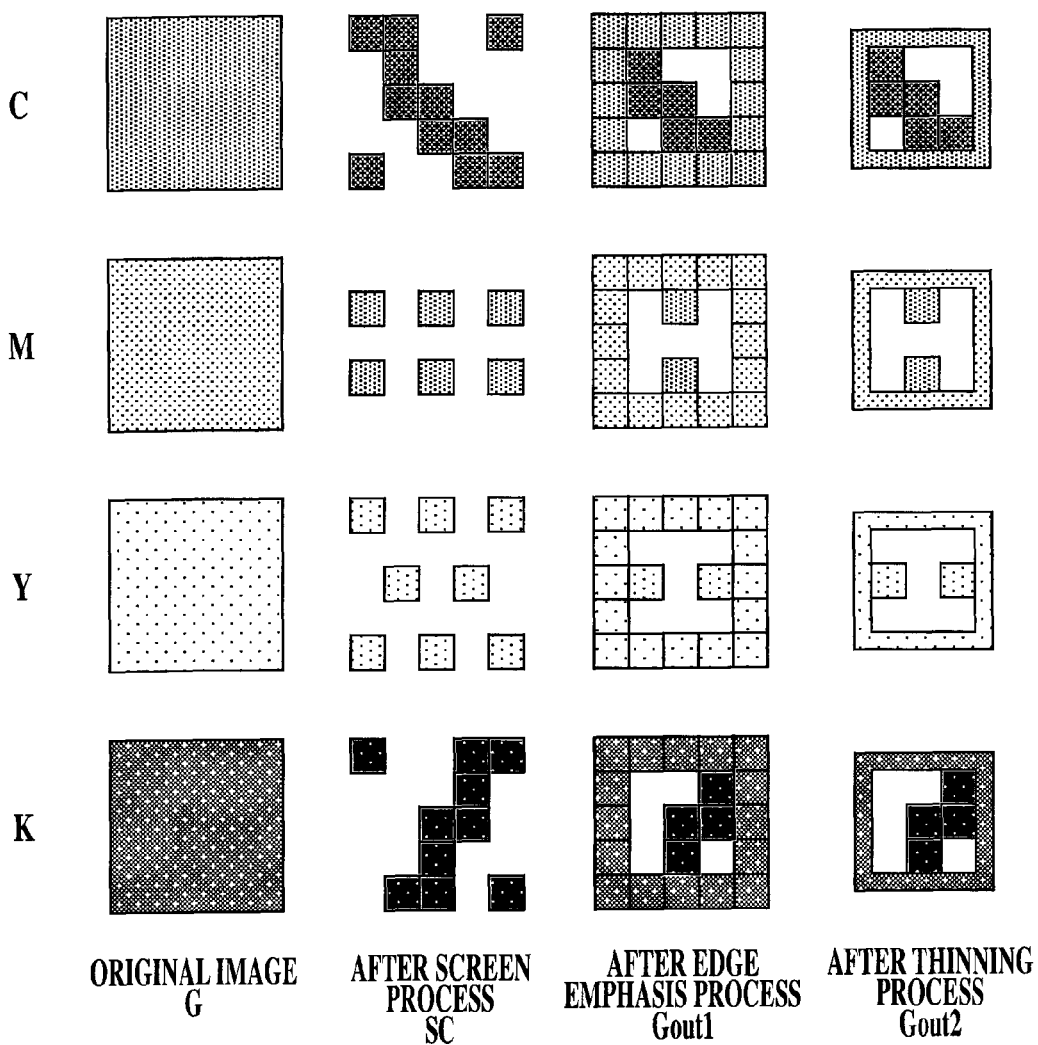
FIG. 9 is drawings indicating an example of images to which various image processes is performed to original images of four colors.

FIG. 9 shows an example of the above mentioned adjustment performed when the black object is formed by overlapping halftone images G of four colors (CMYK). The image SC obtained after performing the screen process to the image G of each color is obtained from the screen processing section 13. Since the original image G is halftone, it is understood that the jaggy generates by performing the screen process. The image Gout1 is obtained after performing the edge emphasis process in order to prevent the jaggy. However, the image Gout1 becomes thick because toners of each color in the edge portion overlap. In contrast, since the edge adjustment section 14 performs the thinning process to the edge with respect to the black object, the obtained one is the pixel value IS of the edge and others are the image Gout2 of the pixel value SC. Since the image Gout2 has a small pixel value in the edge portion, the toners does not extend when overlapping toners of each color in the edge portion and it is possible to control thickness.

Figure 10:
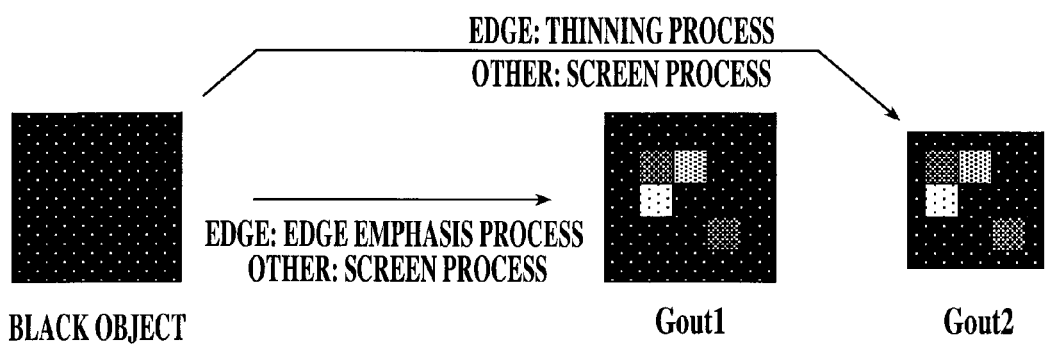
FIG. 10 is drawings after overlapping images of four colors.
Figure 11:
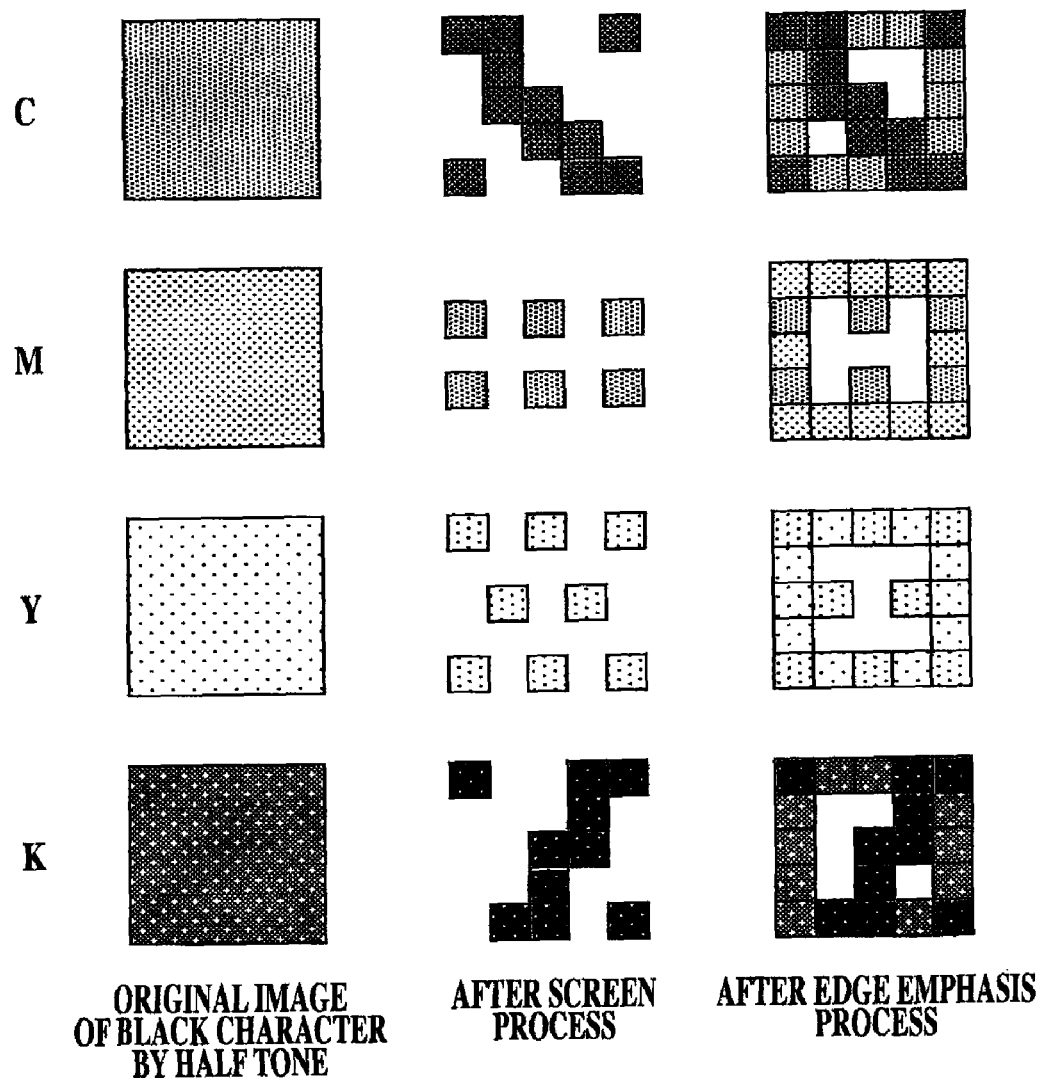
FIG. 11 is drawings for explaining an image process relating to a related art.
Figure 12:
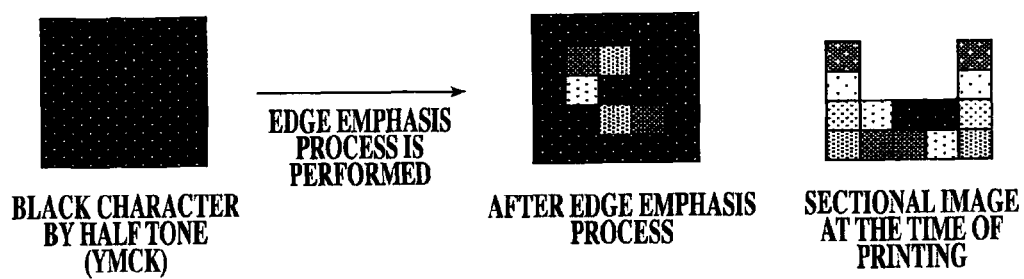
FIG. 12 is drawings indicating a process result after processing an image of black character of halftone by a method relating to a related art.
Figure 13:
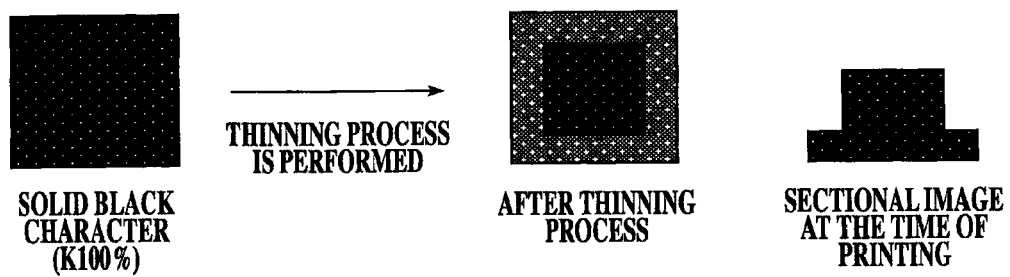
FIG. 13 is drawings indicating a process result after processing an image of black character of solid by a method relating to a related art.

FIG. 10 shows a top view of an image obtained by overlapping images of four colors shown in FIG. 9.

As shown in FIG. 10, when the image Gout1 is printed, the overlapping portion of the toners in the edge portion becomes large. On the other hand, when image Gout2 is printed, the overlapping portion of the toners of each color in the edge portion becomes small by performing the thinning process with respect to the edge portion at the time of printing, the thickness is controlled.

As mentioned above, according to this embodiment, the edge extraction section 11 extracts the edge of the object of the line drawing included in an image, and outputs the edge information Ed. Also, the judgment section 12 judges a possibility that the object of the line drawing is the black object, and outputs the judgment information P. In order to adjust the pixel value of the edge, the edge process section 14 performs, based on the edge information Ed and the judgment information P, the edge emphasis process or the thinning process with respect to the edge of the object, or outputs a result of the screen process without performing further processing. Thereby, with respect to the edge of the black object easy to become thick, it is possible to adjust it by performing the thinning process so as not to become thick.

Accordingly, even if the black color is represented by overlapping a plurality of colors of halftone images, it is possible to prevent the image quality deterioration that the line drawing becomes thick. Also, in spite of the line drawing representing the same black color, it is possible to prevent the phenomenon of becoming thin or thick with respect to the line drawing of the solid of the black monochrome and the line drawing of the halftone of YMCK mixed color. As a result, it is possible to reproduce the stable black object.

Also, the possibility that the object is the black object is judged in a plurality of stages. When P=0 is satisfied, there is no possibility being the black object. In this case, the edge emphasis process can be performed. When P=1 to 3 is satisfied, there is a possibility being the black object. In this case, the thinning process, and so on can be performed. That is, since the process can be performed according to the judged possibility, it is possible to perform a proper adjustment according to the stage. Also, since the thinning process is performed when P=4 is satisfied and the object is the solid object, it is possible to perform a proper process when the object is the solid object Moreover, the above mentioned embodiments are suitable examples which applied the present invention, and the present invention is not limited to this.

For example, in the embodiment, when P>1 is satisfied and there is a possibility being at least black object, the thinning process can be performed. However, with respect to P=1 and P=2, that is it can not be judged that the object is certainly the black object, to perform the thinning process as well as P=3 that is the high possibility being the black object, or to perform the edge emphasis process may be selectively operated by a user. The flexibility improves about adjustment of an image quality by performing the process according to the selecting operation by the operation section 13

Also, when it is judged that there is a possibility being the black object, the thinning process is only performed. However, the edge emphasis process may be performed to the black object while making a degree of emphasis of the edge emphasis process small. In this case, though the line drawing becomes thick in comparison with performing the thinning process, it is possible to control the jaggy of screen process and reduce becoming the edge thick.

Also, though an example applied to the MFT was explained, it may be applied to a computer apparatus performing an image process. A program that realizes the above mentioned image processing function of the computer apparatus may be provided as software.

In accordance with a first aspect of the preferred embodiment of the present invention, there is provided an image processing apparatus comprising:

an edge extraction section for extracting an edge of an object of a character or a line drawing included in an image;

a judgment section for judging, based on the image, a possibility that the object is an image including a plurality of colors and the object is a black object having a pixel value of an image of each color being not less than a certain value; and an edge processing section for adjusting the pixel value of the extracted edge of the object according to a result obtained by the judging by the judgment section.

Preferably, the edge processing section adjusts the pixel value by performing a thinning process to the edge of the object when the judgment section judges that there is a possibility that the object is the black object.

Preferably, the edge processing section adjusts the pixel value by performing an edge emphasis process to the edge of the object when the judgment section judges that there is no possibility that the object is the black object.

Preferably, the judgment section performs the judging based on a result obtained by comparing the pixel value of the image of each color with a threshold value.

According to the image processing apparatus, when it is judged that there is a possibility of black object easy to become thick, it is possible to adjust pixel values of an edge by performing the thinning process so as to become small. Accordingly, even if a black monochrome is represented by overlapping halftone images for a plurality of colors, it is possible to prevent image deterioration that character becomes thick. Also, it is possible to prevent that a line drawing of solid of the black monochrome and a line drawing of the halftone composed of a plurality of colors of CMYK become different thickness visually.

Preferably, the judgment section judges the possibility that the object is the black object in a plurality of stages, and the edge processing section performs the adjusting according to the stage of the judged possibility.

According to this, it is possible to perform processes corresponding to possibilities, and adjust a proper adjustment according to the stages.

Preferably, the image processing apparatus further comprises:

an operation section for selecting one of a thinning process to be performed to the edge of the object and an edge emphasis process to be performed to the edge of the object when the stage of the possibility judged by the judgment section is a stage that a possibility being the black object is not very high and there is a possibility being at least black object, wherein the edge processing section adjusts the pixel value by performing a process selected by the operation section to the edge of the object when the judgment section judges that the stage of the possibility is the stage that the possibility being the black object is not very high and there is the possibility being at least black object.

According to this, it is possible to certainly prevent that the black object becomes thick by performing the thinning process when there is the possibility being at least black object.

Also, in accordance with another aspect of the preferred embodiment of the present invention, there is provided an image processing method comprising:

an edge extraction step of extracting an edge of an object of a character or a line drawing included in an image;

a judgment step of judging, based on the image, a possibility that the object is an image including a plurality of colors and the object is a black object having a pixel value of an image of each color being not less than a certain value; and an edge processing step of adjusting the pixel value of the extracted edge of the object according to a result obtained by the judging by the judgment step.

Preferably, the edge processing step adjusts the pixel value by performing a thinning process to the edge of the object when the judgment step judges that there is a possibility that the object is the black object.

Preferably, the edge processing step adjusts the pixel value by performing an edge emphasis process to the edge of the object when the judgment step judges that there is no possibility that the object is the black object.

Preferably, the judgment step performs the judging based on a result obtained by comparing the pixel value of the image of each color with a threshold value.

According to the image processing apparatus, when it is judged that there is a possibility of black object easy to become thick, it is possible to adjust pixel values of an edge by performing the thinning process so as to become small. Accordingly, even if a black monochrome is represented by overlapping halftone images for a plurality of colors, it is possible to prevent image deterioration that character becomes thick. Also, it is possible to prevent that a line drawing of solid of the black monochrome and a line drawing of the halftone composed of a plurality of colors of CMYK become different thickness visually.

Preferably, the judgment step judges the possibility that the object is the black object in a plurality of stages, and the edge processing step performs the adjusting according to the stage of the judged possibility.

According to this, it is possible to perform processes corresponding to possibilities, and adjust a proper adjustment according to the stages.

Preferably, the image processing method further comprises:

an operation step of selecting one of a thinning process to be performed to the edge of the object and an edge emphasis process to be performed to the edge of the object when the stage of the possibility judged by the judgment step is a stage that a possibility being the black object is not very high and there is a possibility being at least black object, wherein the edge processing step adjusts the pixel value by performing a process selected by the operation step to the edge of the object when the judgment step judges that the stage of the possibility is the stage that the possibility being the black object is not very high and there is the possibility being at least black object.

According to this, it is possible to certainly prevent that the black object becomes thick by performing the thinning process when there is the possibility being at least black object.

Also, in accordance with another aspect of the preferred embodiment of the present invention, there is provided an image processing apparatus comprising:

an input section for inputting image data of an image;

an edge extraction section for extracting an edge of an object of a character or a line drawing included in an image;

a judgment section for judging, based on the image data, a possibility that the object is an image including a plurality of colors and the object is a black object having a pixel value of an image of each color being not less than a certain value;

an edge processing section for adjusting the pixel value of the extracted edge of the object according to a result obtained by the judging by the judgment section; and an output section for performing printout based on the image data including the adjusted pixel value of the edge.

Preferably, the edge processing section adjusts the pixel value by performing a thinning process to the edge of the object when the judgment section judges that there is a possibility that the object is the black object.

Preferably, the edge processing section adjusts the pixel value by performing an edge emphasis process to the edge of the object when the judgment section judges that there is no possibility that the object is the black object.

Preferably, the judgment step performs the judging based on a result obtained by comparing the pixel value of the image of each color with a threshold value.

According to the image processing apparatus, when it is judged that there is a possibility of black object easy to become thick, it is possible to adjust pixel values of an edge by performing the thinning process so as to become small. Accordingly, even if a black monochrome is represented by overlapping halftone images for a plurality of colors, it is possible to prevent image deterioration that character becomes thick. Also, it is possible to prevent that a line drawing of solid of the black monochrome and a line drawing of the halftone composed of a plurality of colors of CMYK become different thickness visually.

Preferably, the judgment section judges the possibility that the object is the black object in a plurality of stages, and the edge processing section performs the adjusting according to the stage of the judged possibility.

According to this, it is possible to perform processes corresponding to possibilities, and adjust a proper adjustment according to the stages.

Preferably, the image processing apparatus further comprises:

an operation section for selecting one of a thinning process to be performed to the edge of the object and an edge emphasis process to be performed to the edge of the object when the stage of the possibility judged by the judgment section is a stage that a possibility being the black object is not very high and there is a possibility being at least black object, wherein the edge processing section adjusts the pixel value by performing a process selected by the operation section to the edge of the object when the judgment section judges that the stage of the possibility is the stage that the possibility being the black object is not very high and there is the possibility being at least black object.

According to this, it is possible to certainly prevent that the black object becomes thick by performing the thinning process when there is the possibility being at least black object.

Although various exemplary embodiments have been shown and described, the invention is not limited to the embodiments shown. Therefore, the scope of the invention is intended to be limited solely by the scope of the claims that follow.

The entire disclosure of Japanese Patent Applications No. 2007-237706 filed on Sep. 13, 2007 including specifications, claims, drawings and summaries are incorporated herein by reference in their entirety.

What is claimed is:

1. An image processing apparatus, comprising:
   an edge extraction section for extracting an edge of an object of a character or an object of a line drawing included in an image;
   a judgment section for judging, based on the image, a possibility that the object is an image including a plurality of colors and the object is a black object having a pixel value of an image of each color being not less than a certain value; and
   an edge processing section for adjusting the pixel value of the extracted edge of the object according to a result obtained by the judging by said judgment section,
   wherein said edge processing section adjusts the pixel value by performing an edge emphasis process to the edge of the object, when said judgment section judges that there is no possibility that the object is the black object.

2. An image processing apparatus according to claim 1, wherein said edge processing section adjusts the pixel value by performing a thinning process to the edge of the object when said judgment section judges that there is a possibility that the object is the black object.

3. An image processing apparatus according to claim 1, further comprising:
   an operation section for selecting one of a thinning process to be performed to the edge of the object or an edge emphasis process to be performed to the edge of the object, when the stage of the possibility judged by said judgment section is a stage that there is a possibility of being at least the black object,
   wherein:
      said judgment section judges the possibility that the object is the black object in a plurality of stages; and
      said edge processing section adjusts the pixel value according to the stage of the judged possibility by performing a process selected by said operation section to the edge of the object, when said judgment section judges that the stage of the possibility is the stage that there is the possibility of being at least the black object.

4. An image processing apparatus according to claim 1, wherein said judgment section performs the judging based on a result obtained by comparing the pixel value of the image of each color with a threshold value.

5. An image processing method, comprising:
   an edge extraction step of extracting an edge of an object of a character or an object of a line drawing included in an image;
   a judgment step of judging, based on the image, a possibility that the object is an image including a plurality of colors and the object is a black object having a pixel value of an image of each color being not less than a certain value; and
   an edge processing step of adjusting the pixel value of the extracted edge of the object according to a result obtained by the judging by said judgment step,
   wherein said edge processing step adjusts the pixel value by performing an edge emphasis process to the edge of the object, when said judgment step judges that there is no possibility that the object is the black object.

6. An image processing method according to claim 5, further comprising:
   an operation step of selecting one of a thinning process to be performed to the edge of the object or an edge emphasis process to be performed to the edge of the object, when the stage of the possibility judged by said judgment step is a stage that there is a possibility of being at least the black object,
   wherein:
      said judgment step judges the possibility that the object is the black object in a plurality of stages; and
      said edge processing step adjusts the pixel value according to the stage of the judged possibility by performing a process selected by said operation step to the edge of the object, when said judgment step judges that the stage of the possibility is the stage that there is the possibility of being at least the black object.

7. An image processing method according to claim 5, wherein said judgment step performs the judging based on a result obtained by comparing the pixel value of the image of each color with a threshold value.

8. An image forming apparatus, comprising:
   an input section for inputting image data of an image;
   an edge extraction section for extracting an edge of an object of a character or an object of a line drawing included in an image;
   a judgment section for judging, based on the image data, a possibility that the object is an image including a plurality of colors and the object is a black object having a pixel value of an image of each color being not less than a certain value;
   an edge processing section for adjusting the pixel value of the extracted edge of the object according to a result obtained by the judging by said judgment section; and
   an output section for performing printout based on the image data including the adjusted pixel value of the edge,
   wherein said edge processing section adjusts the pixel value by performing an edge emphasis process to the edge of the object, when said judgment section judges that there is no possibility that the object is the black object.

9. An image forming apparatus according to claim 8, wherein said edge processing section adjusts the pixel value by performing a thinning process to the edge of the object when said judgment section judges that there is a possibility that the object is the black object.

10. An image processing apparatus according to claim 8, further comprising:
    an operation section for selecting one of a thinning process to be performed to the edge of the object or an edge emphasis process to be performed to the edge of the object, when the stage of the possibility judged by said judgment section is a stage that there is a possibility of being at least the black object, wherein:
said judgment section judges the possibility that the object is the black object in a plurality of stages; and
said edge processing section adjusts the pixel value according to the stage of the judged possibility by performing a process selected by said operation section to the edge of the object, when said judgment section judges that there is the possibility of being at least the black object.

11. An image forming apparatus according to claim 8, wherein said judgment section performs the judging based on a result obtained by comparing the pixel value of the image of each color with a threshold value.

12. An image processing method according to claim 5, wherein said edge processing step adjusts the pixel value by performing a thinning process to the edge of the object when said judgment step judges that there is a possibility that the object is the black object.

* * * * *